(12) United States Patent
Paniconi et al.

(10) Patent No.: US 8,059,719 B2
(45) Date of Patent: Nov. 15, 2011

(54) ADAPTIVE AREA OF INFLUENCE FILTER

(75) Inventors: Marco Paniconi, Campbell, CA (US);
James J. Carrig, San Jose, CA (US);
Zhourong Miao, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1540 days.

(21) Appl. No.: 11/229,284

(22) Filed: Sep. 16, 2005

(65) Prior Publication Data
US 2007/0064807 A1    Mar. 22, 2007

(51) Int. Cl.
*H04N 11/02*    (2006.01)
*H04B 1/66*    (2006.01)
(52) U.S. Cl. ........ 375/240.16; 375/240.29; 375/E7.123; 375/E7.256
(58) Field of Classification Search .............. 375/240.16, 375/240.29, E7.123, E7.256
See application file for complete search history.

(56) References Cited

U.S. PATENT DOCUMENTS

| | | | |
|---|---|---|---|
| 4,922,341 A | 5/1990 | Strobach | |
| 5,047,850 A | 9/1991 | Ishii et al. | |
| 5,654,771 A | 8/1997 | Tekalp | |
| 5,872,866 A | 2/1999 | Strongin et al. | |
| 5,974,188 A | 10/1999 | Benthal | |
| 6,069,670 A * | 5/2000 | Borer | 348/620 |
| 6,178,205 B1 * | 1/2001 | Cheung et al. | 375/240.29 |
| 6,208,692 B1 | 3/2001 | Song et al. | |
| 6,212,235 B1 | 4/2001 | Nieweglowski et al. | |
| 6,456,340 B1 * | 9/2002 | Margulis | 348/745 |
| 6,466,624 B1 | 10/2002 | Fogg | |
| 6,480,615 B1 | 11/2002 | Sun et al. | |
| 6,590,934 B1 | 7/2003 | Kim | |
| 6,591,015 B1 | 7/2003 | Yasunari et al. | |
| 6,608,865 B1 | 8/2003 | Itoh | |
| 6,690,729 B2 | 2/2004 | Hayashi | |
| 6,754,269 B1 | 6/2004 | Yamaguchi et al. | |
| 6,765,965 B1 | 7/2004 | Hanami et al. | |
| 6,782,054 B2 | 8/2004 | Bellers | |
| 6,864,994 B1 | 3/2005 | Harrington | |
| 7,242,815 B2 * | 7/2007 | Kalevo et al. | 382/261 |

(Continued)

FOREIGN PATENT DOCUMENTS

WO    WO 00/16563 A1    3/2000

(Continued)

OTHER PUBLICATIONS

Leymarie et al, Tracking Deformable Objects in the Plane Using an Active Contour Model, IEEE Trans. on Pattern Analysis and Mach. Intel., vol. 15 No. 6, Jun. 1993, pp. 617-634.

(Continued)

*Primary Examiner* — Stephen Koziol
(74) *Attorney, Agent, or Firm* — Blakely, Sokoloff, Taylor & Zafman LLP (57) ABSTRACT

A method of generating an adaptive temporal filter is performed by constructing a motion vector area cell around each of a plurality of motion vectors in a target image, selecting a pixel in the target image, constructing a pixel area cell around the selected pixel, determining an overlap area between the motion vector area cells and the pixel area cell, generating filter weights from the overlap area, and using the filter weights to filter the selected pixel.

27 Claims, 10 Drawing Sheets

U.S. PATENT DOCUMENTS

| | | | |
|---|---|---|---|
| 7,492,823 B2 * | 2/2009 | Lee et al. | 375/240.16 |
| 2004/0057517 A1 | 3/2004 | Wells | |
| 2004/0062307 A1 | 4/2004 | Hallapuro et al. | |
| 2004/0101050 A1 * | 5/2004 | Lee et al. | 375/240.13 |
| 2004/0131267 A1 | 7/2004 | Adiletta et al. | |
| 2004/0233991 A1 | 11/2004 | Sugimoto et al. | |
| 2005/0100092 A1 | 5/2005 | Sekiguchi et al. | |
| 2005/0135483 A1 | 6/2005 | Nair | |
| 2007/0009050 A1 * | 1/2007 | Wang et al. | 375/240.29 |

FOREIGN PATENT DOCUMENTS

| | | |
|---|---|---|
| WO | WO 01/78402 A1 | 10/2001 |
| WO | WO 02/37859 A2 | 5/2002 |
| WO | WO 2004/047454 A1 | 6/2004 |
| WO | WO 2005/069629 A1 | 7/2005 |

OTHER PUBLICATIONS

Reshef et al, Low Bit-Rate Video Coding Using Iterave Affine Motion Estimation and Quadtree Segmentation, Proc. Int'l Conf. on Dig. Signal Processing, Jun. 1995 pp. 427-431.

Chang et al, Simultaneous Motion Estimation and Segmentation, IEEE Transactions on Image Processing, vol. 6 No. 9, Sep. 1997, pp. 1326-1333.

Zhang et al, Image Sequence Segmentation Using 3-D Structure Tensor and Curve Evolution, IEEE Trans. on Circuits and Sys. For Video Tech., vol. 11 No. 5, May 2001, pp. 629-640.

Orchard et al, Overlapped Block Motion Compensation: An Estimation-Theoretic Approach, IEEE Transactions on Image Processing, vol. 3 No. 5, Sep. 1994, pp. 693-699.

Du et al, Two Dimensional Hierarchical Mesh Based Video Compression Techniques, 6th Int'l Symposium on DSP for Communication Systems, 2002, Sydney Australia, pp. 247-252.

* cited by examiner

ADAPTIVE AREA OF INFLUENCE FILTER

FIELD OF INVENTION

The invention is related to the field of video compression.

BACKGROUND

A temporal prediction filter is used in a video compression process to predict a target image from a set of previously decoded reference images. The temporal prediction process is effective at removing a significant amount of temporal redundancy, which generally results in a higher coding efficiency. The prediction process uses a set of motion vectors and a filter that operates on the motion vectors to predict the target image.

Figure 1:
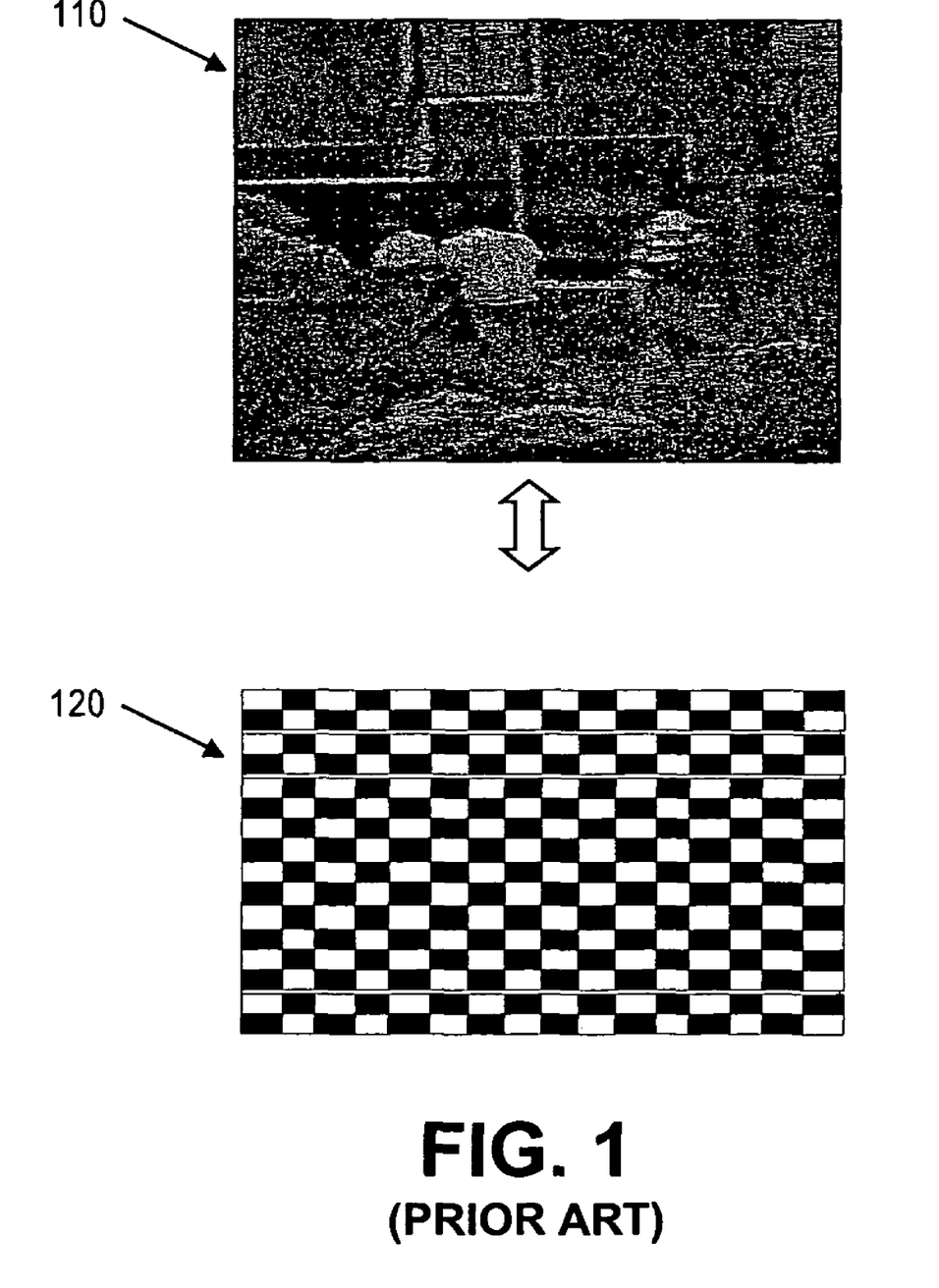
FIG. 1 shows an example of a conventional block based temporal filter.

For example, the prediction method divides a reference image 110 into multiple fixed-size blocks 120, as shown in FIG. 1. Each block has an associated motion vector to describe the motion of the block relative to the target image. The motion vectors are shown by the white dots in image 110. A temporal prediction filter uses the associated motion vector to perform a simple motion compensation technique on each block in the reference image to predict the location of the block in the target image. Thus, each block in the target image is estimated from a block in the reference image using the single motion vector. However, this approach treats each motion vector independently and is not adaptive to image features.

Conventional temporal filters, which use a single motion vector to predict the location of an associated block, or rely on a filter defined for a regular motion vector pattern, need a regular distribution of motion vectors to perform temporal prediction. Therefore, they are unable to adapt the prediction process to an irregular pattern of motion vectors. There is a need for a filter that can locally adapt its tap and filter coefficients to the variations of an irregular pattern of motion vectors. There is also a need for a temporal filter that has flexibility to adapt to object boundaries and spatial textures.

SUMMARY

A method of generating an adaptive temporal filter is performed by constructing a motion vector area cell around each of a plurality of motion vectors in a target image, selecting a pixel in the target image, constructing a pixel area cell around the selected pixel, determining an overlap area between the motion vector area cells and the pixel area cell, generating filter weights from the overlap area, and using the filter weights to filter the selected pixel.

BRIEF DESCRIPTION OF THE DRAWINGS

The present invention is illustrated by way of example and may be better understood by referring to the following description in conjunction with the accompanying drawings, in which.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. For example, skilled artisans will understand that the terms field or frame or image that are used to describe the various embodiments are generally interchangeable as used with reference to video data.

An adaptive area of influence (AAOI) temporal filter automatically adapts to an irregular pattern of motion vectors, object features, and spatial textures when predicting a target image. The AAOI filter operates in the time-domain over motion compensated signals, which is different from other methods that attempt to filter motion vectors directly (e.g., triangulation filtering in the motion vector domain). For example, because the AAOI filtering method operates in the time-domain, it is more amenable to adaptation to object and spatial textures. In one embodiment, the AAOI filter performs a two stage process to couple neighboring motion vectors during the prediction of a pixel. The first stage adapts the filter to an irregular sampling pattern of motion vectors, to object shapes, and to boundaries. The second stage adapts the filter to spatial textures of the image.

Figure 2:
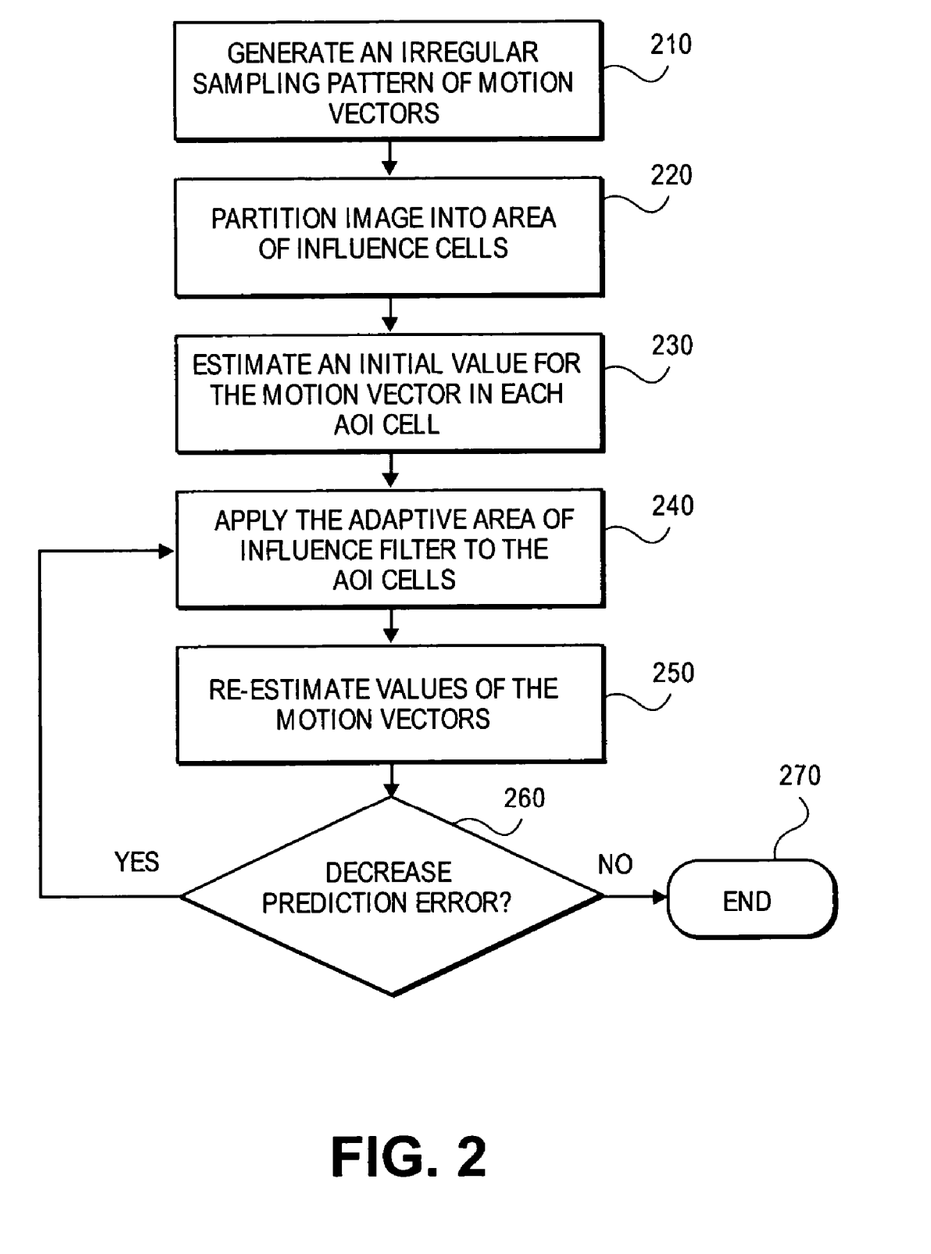
FIG. 2 shows an example of an adaptive temporal filtering procedure.

An example of an adaptive temporal filtering procedure is shown in FIG. 2. At 210, an irregular sampling pattern of motion vectors is generated for an image. Such irregular patterning may be done in various ways using methods that are known to those of skill in the art. An example of an irregular pattern of motion vectors is shown in block 310 of FIG. 3. The white dots in the image 310 represent the motion vectors. With this adaptive sampling pattern, the motion vectors are more concentrated in regions that are difficult to predict from the reference image (i.e., image regions with more complex motion, such as regions near moving boundaries). Fewer motion vectors are placed in simple motion regions, such as image background regions, for example.

Figure 3:
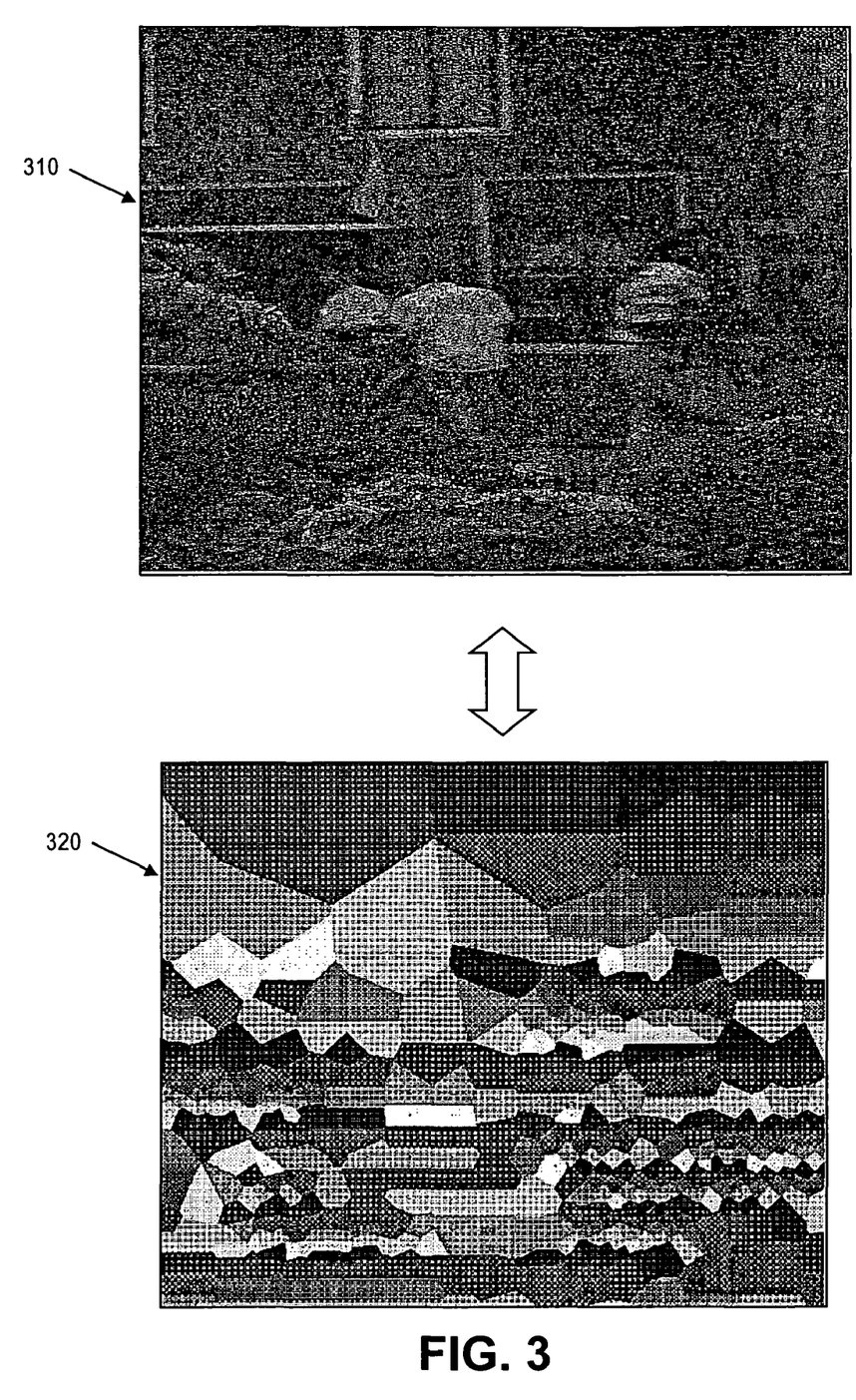
FIG. 3 shows examples of an irregular pattern of motion vectors and area of influence cells used in the adaptive temporal filtering procedure.

Returning to FIG. 2, at 220, the image is partitioned into multiple cells, called area of influence cells (AOI cells), where each AOI cell has one motion vector as its node. An example of an image partitioned into AOI cells is shown in FIG. 3, at block 320. Each AOI cell represents a region that is influenced more by the motion vector inside of the cell than by any other motion vector in the image. Because an AOI cell is generated for each motion vector, the size of the AOI cells may be related to features of objects in the image, such as boundary regions. For example, AOI cells near a boundary region between objects may be smaller than AOI cells in an image background region. Also, the shape of the AOI cell can be locally modified to adapt to the shape of an object's boundary. One embodiment of a method for generating AOI cells is a distance nearest motion vector partitioning method (e.g., Voronoi cells). Other partitioning methods may be used, such as block or triangular methods for example. Also, the AOI cell can be locally modified to adapt to an object boundary.

Returning to FIG. 2, at 230, an initial motion estimation is performed to determine an initial value for the motion vector in each AOI cell. The initial motion estimation maps the AOI cell associated with the motion vector to a corresponding cell in the reference image, and measures a displacement between the two cells. The displacement provides the initial value for each motion vector. Consequently, the initial value does not reflect any influence from surrounding motion vectors, because it is determined by this cell-to-cell mapping and displacement measurement. Therefore, the initial value for a particular motion vector is independent of other motion vectors.

At 240, the adaptive area of influence (AAOI) filter is applied to the area of influence cells to perform temporal prediction for the target image. The filter is applied in the time domain to generate a prediction result for the target image given the set of motion vector values and sampling pattern. The AAOI filter uses a filter tap and filter coefficients that are defined by an area of overlapping regions to capture the relevance of motion vectors neighboring a pixel to be predicted. At 250, the prediction results produced by the filter are used to re-estimate the values of the motion vectors, so as to improve the accuracy of the adaptive filter. At 260, in some embodiments, the process may return to 240 to decrease the prediction error generated by the adaptive area of influence filter. Otherwise, the process ends at 270.

Referring to 240 shown in FIG. 2 in more detail, the adaptive area of influence filter is applied to the area of influence cells to generate a temporal prediction of the target image from the reference image and the set of motion vectors. The filter has the following structure. Let $\{v_j\}$ denote the set of N motion vectors, and I(x) the reference image (a previously decoded image). Let S(x) denote some set of motion vectors surrounding the location of pixel x. The prediction of that target pixel x can be generally expressed as:

$$I^{pred}(x) = \sum_{i \in S(x)} f_i I^{ref}(x + v_i)$$

where $\{f_i\}$ is a set of filter coefficients, and $x+v_i$ is the motion compensated pixel when motion vector $v_i$ is applied to pixel x. The support or tap of the filter is defined by the set S(x). The tap support S(x) and the filter coefficients $\{f_i\}$ are, in general, functions of the pixel position x and its neighboring motion vectors. That is, the filter coefficients can change for each pixel, because the distribution of motion vectors changes throughout the image. Hence, the filter locally adapts to the changing motion vector pattern.

Figure 4A:
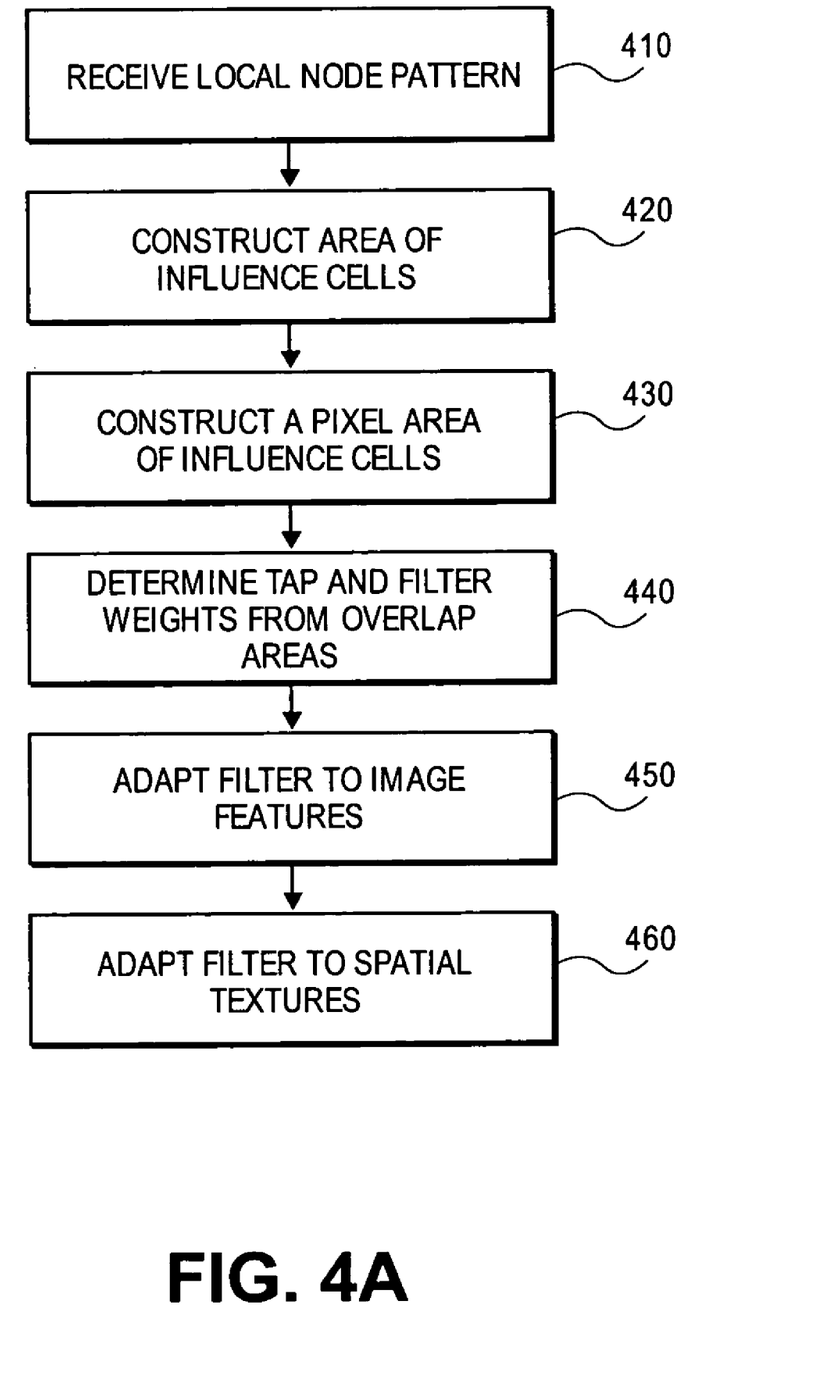
FIGS. 4A and 4B show examples of a method to generate an adaptive temporal filter used in the adaptive temporal filtering procedure.

In one embodiment, filter coefficients $\{f_i\}$ are computed using the method illustrated by FIG. 4A. In the first stage, a natural tap structure and filter weights are defined, and in the second stage, the filter is adapted to spatial textures of the image. The first stage generates an AAOI filter that can adapt to features such as an irregular sampling pattern, as well as object shapes and boundaries. The second stage allows the AAOI filter to adapt to spatial textures of the image during a motion vector based temporal prediction process for video compression.

The first stage begins at 410, receiving a local motion vector sampling pattern, that contains motion vectors in the neighborhood of a target pixel to be predicted. At 420, area of influence cells are constructed around each local motion vector. The local area of the target pixel is thus partitioned into a set of AOI cells. At 430, in order to interpolate the pixel, it is viewed as a new node, and a pixel area of influence cell is constructed around it. Then, at 440, the area of each neighboring AOI cell that overlaps the pixel area of influence cell is determined. The overlapping areas define a natural tap structure and filter weight. In other words, the tap structure is defined by each motion vector i whose AOI cell has a non-zero overlapping area $A_i$ with the pixel area cell. The filter weight of each motion vector in the tap structure is defined by the ratio $A_i/A$. That is, for some pixel location x:

$$S(x) = \{i \mid A_i > 0\}$$

$$f_i = \frac{A_i}{A}$$

where S(x) is a set of local motion vectors in the neighborhood of pixel x, $A_i$ is an overlapping area of an AOI cell for motion vector i in the set S(x) and the pixel influence cell, A is the total overlap area of the AOI cells and the pixel influence cell, and $f_i$ is the filter weight.

At 450, the filter is adapted to image features, such as an object boundary of a moving object, for example. The shape of the area of influence cells in some embodiments changes to adapt to the boundary of the moving object. The area cells are adapted to an object boundary in the image by constraining the motion vector area cells and pixel area cell to include only pixels that belong to the same object. This generates modified AOI cells around the pixel to be predicted. Therefore, in one embodiment, the filter support and coefficients are expressed as:

$$S(x) = \{i \mid \tilde{A}_i > 0\}$$

$$f_i = \frac{\tilde{A}_i}{\tilde{A}}$$

where $\tilde{A}_i$ is the modified AOI cell for motion vector i, due to the object boundary. Each modified AOI cell includes pixels in the same motion layer as the pixel to be predicted, and excludes pixels in other motion layers. At the conclusion of this first stage, the filter has adapted to the both the irregular pattern of motion vectors and to the boundary of the moving object.

After generating a prediction for each pixel in the image, the second stage of the filtering process is performed. In the second stage, at 460, the filter is adapted to spatial textures. Because the prediction that is output from the first stage of the AAOI filter is in the form of a regular pattern of sampled data, a least squared (LS) trained filter is used in some embodiments in the second stage to adapt the filter to spatial textures. In another embodiment, a spatial adaptation process can directly modify the AOI cells in stage 1 to include only those pixels that have a similar spatial texture.

The adaptive filtering process illustrated in FIG. 4A generates an area-based filter defined in the time domain that couples neighboring motion vectors during a temporal prediction process. The filter adapts naturally to a non-uniform or irregular sampling pattern of motion vectors in a motion image, object shapes and boundaries, and spatial textures.

Figure 4B:
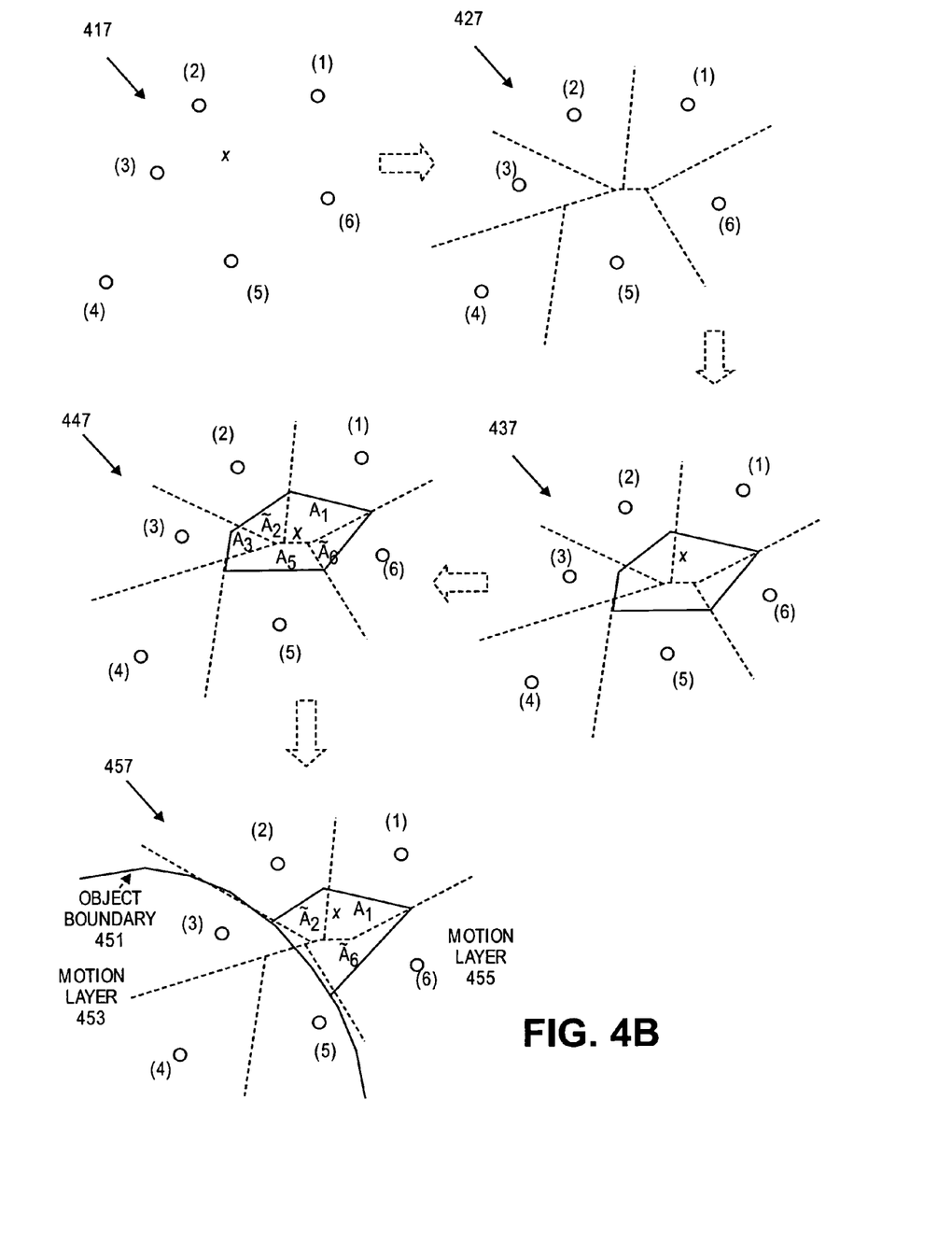

An example of the intermediate results produced during the first stage of the process of FIG. 4A is shown in FIG. 4B. At 417, a local node pattern is received. The local node pattern includes a set of motion vectors (represented by the circles) that are in the neighborhood of pixel x, which needs to be predicted. The motion vectors are numbered, from (1) through (6). At 427, area of influence cells are constructed around the motion vectors. Each dashed line represents a boundary between AOI cells. At 437, an area of influence cell, represented by the solid line, is constructed around the pixel x to be predicted.

At 447, an overlap area between the AOI cell of each motion vector and the AOI cell of the pixel is determined. For example, the AOI cell for motion vector (1) overlaps the pixel AOI cell in overlap area $A_1$. The tap and filter weights of the filter are determined by the overlap areas. The tap structure is defined by each motion vector i whose AOI cell has a non-zero overlapping area $A_i$ with the pixel area cell. In this example, the AOI cell for motion vector (4) does not overlap with the pixel AOI cell. Therefore, the filter tap structure for pixel x is motion vectors (1), (2), (3), (5), and (6). The filter weight of each motion vector in the tap structure is defined by the ratio $A_i/A$. For example, in this case, $f_1 = A_1/A$.

At 457, the filter is adapted to image features, such as an object boundary 451 of a moving object, for example. The moving object's object boundary 451 separates motion layers 453 and 455. To interpolate pixel x, the tap structure is modified to include motion vectors that are in the same motion layer as the pixel x. Because pixel x is in motion layer 455, the tap structure from 447 is modified to remove motion vectors (3) and (5), leaving motion vectors (1), (2) and (6) as the tap structure.

Furthermore, at 457, the filter weights are adapted to the shape of the object boundary 451. In this example, the shapes of the area of influence cells along object boundary 451 change to adapt to the boundary of the moving object. Object boundary 451 dissects the AOI cell for motion vector (2). To interpolate pixel x, which is in motion layer 455, the AOI cell for motion vector (2) is redefined to include only those pixels of its original cell that are in motion layer 455. This generates a modified AOI cell around motion vector (2). The shape of the AOI cell for motion vector (6) is also adapted to the object boundary 451. The area between the AOI cell for motion vector (6) and object boundary 451 is in motion layer 455. However, this area was initially included in the AOI cell for motion vector (5). Because motion vector (5) is no longer part of the tap structure for the filter, the pixels in this area now become part of the AOI cell for motion vector (6). The modified overlapping areas, $\tilde{A}_2$ and $\tilde{A}_6$, and overlapping area $A_1$, are used to generate filter weights.

Figure 5:
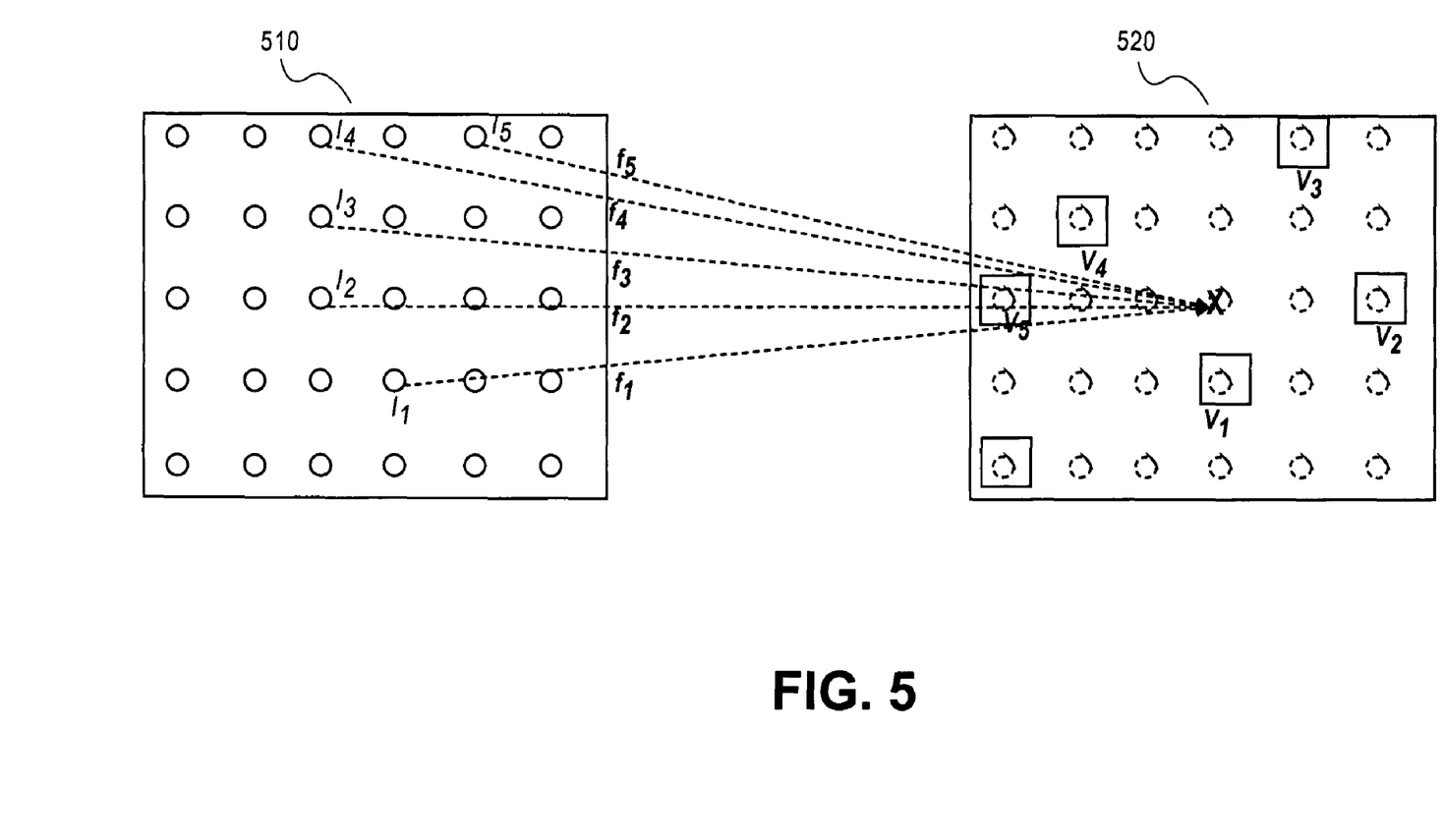
FIG. 5 shows an example of a prediction performed with the adaptive temporal filter.

The filter produced by the method illustrated in FIGS. 4A and 4B is used to predict a pixel in a target image. For example, referring again to 240 of FIG. 2 in more detail, the filter is used to predict a pixel x in the target image, as illustrated in FIG. 5. Pixels in a reference image 510 are used to predict pixels in a target image 520. The reference pixels are represented by solid circles in reference image 510, and the target pixels to be predicted are represented by dashed circles in target image 520.

The filter forms a prediction for pixel x in the target image 520 using a tap structure of local motion vectors $v_1$ through $v_5$. The motion vectors are local to pixel x because each of their respective AOI cells overlap with at least a portion of the AOI cell for pixel x. Each motion vector $\{v_i\}$ in the tap structure maps to image data $\{I_i\}$ in the reference image 510. The adaptive temporal prediction filter adjusts the reference data $\{I_i\}$ by a filter weight $\{f_i\}$ to predict pixel x. In one embodiment, the prediction filter uses the tap structure and the filter weights to generate a prediction according to the following equation:

$$\text{Prediction} = I_1 * f_1 + I_2 * f_2 + I_3 * f_3 + I_4 * f_4 + I_5 * f_5$$

where the filter tap, which is defined by the local motion vectors, and the filter coefficients $\{f_i\}$, are determined by the method illustrated in FIGS. 4A and 4B.

Figure 6:
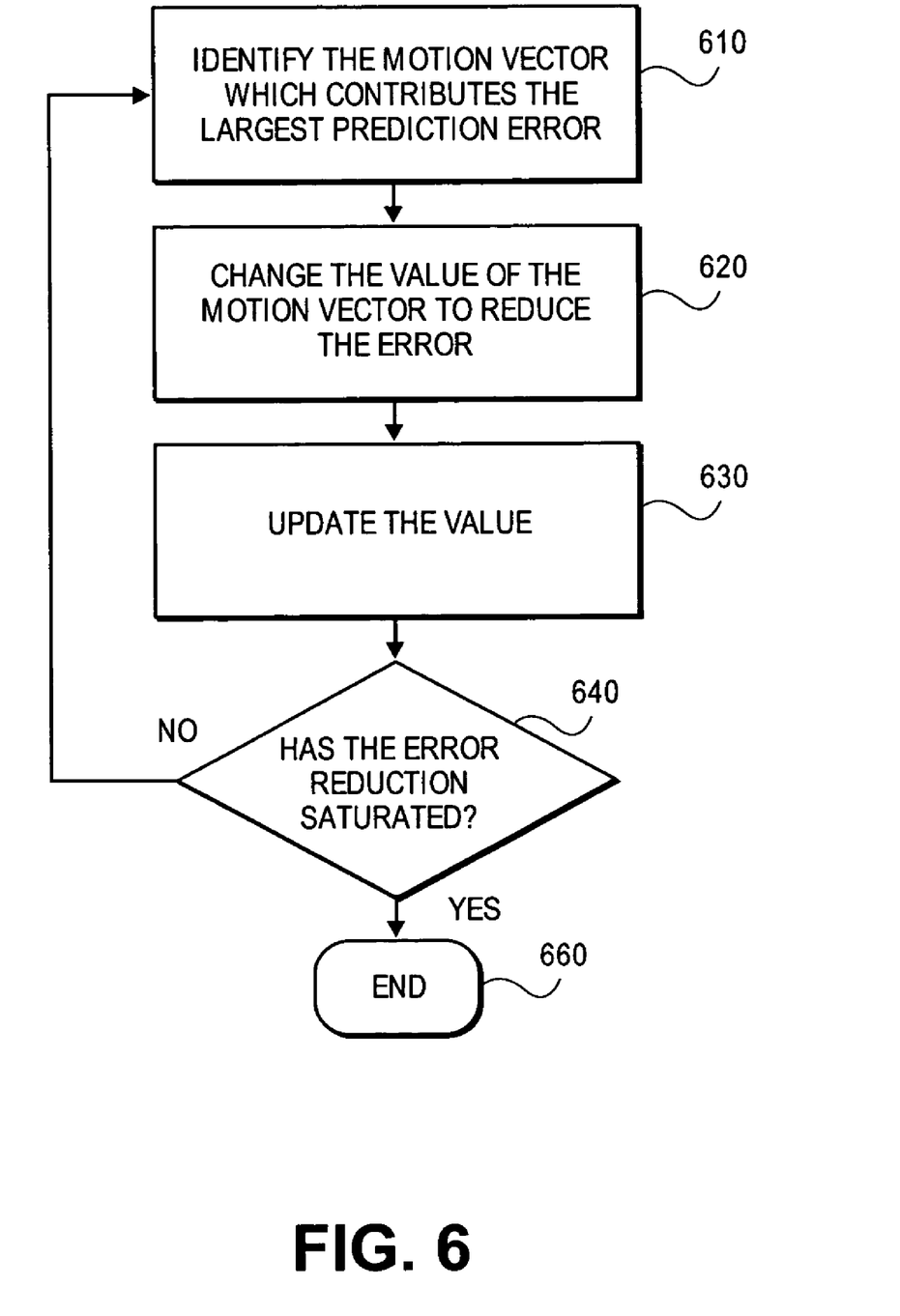
FIG. 6 shows an example of an error reduction method which can be used in the adaptive temporal filtering procedure.

After the initial prediction, the process re-estimates the values of the motion vectors, as shown in block 250 of FIG. 2, to improve the accuracy of the filter. In one embodiment, the re-estimation is performed using the method illustrated in FIG. 6. At 610, the motion vector that contributes the largest prediction error to the AAOI filter is identified. Then, at 620 the value of the identified motion vector is changed until the AAOI filter's prediction error is reduced or minimized. At 630, the value of the motion vector is then updated with the changed value. At 640, if the error reduction has saturated, then the process ends. Otherwise, the process returns to 610 until the prediction error reduction saturates. Then, in some embodiments, the process of FIG. 2 is repeated for all the motion vectors in the image.

Figure 7:
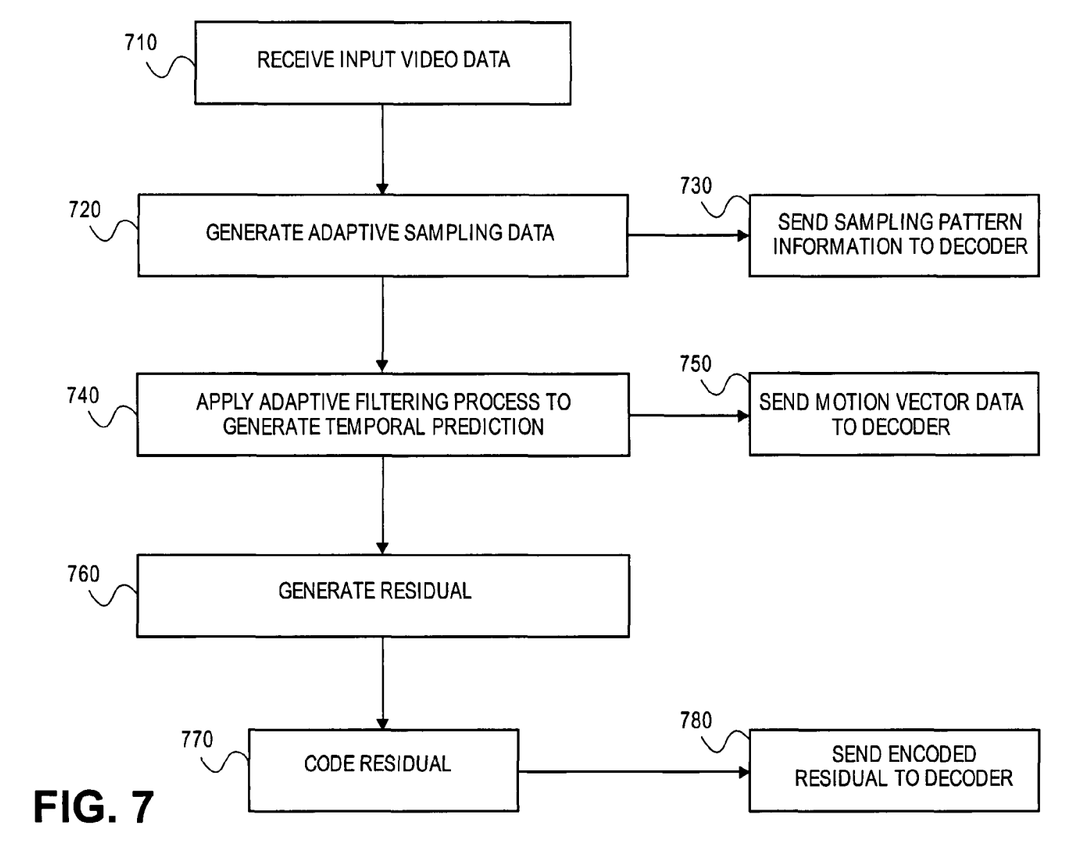
FIG. 7 shows an example of a video compression encoding process that uses the adaptive temporal filter.

In one embodiment, the AAOI filter is used by a video coding system for encoding an image (or frame, or field) of video data, as shown in FIG. 7. At 710, the encoder receives an input target image. (A set of reference images, which contain decoded image data related to the target image, is available to the encoder during the encoding process, and also to the decoder during the decoding process). At 720, the encoder generates a sampling, or distribution, of motion vectors associated with the target image. That is, given a number N of motion vectors, these N motion vectors are placed in the target image. The positions of the motion vectors are generally adapted to areas of motion in the image content, yielding an irregular pattern of motion vectors as shown in FIG. 3, for example. At 730, the sampling pattern information (e.g., bits to represent the pattern) is transmitted to a decoder. Many approaches can be used to generate the adaptive sampling pattern.

At 740, a temporal prediction filtering process is applied to the irregular motion sampling pattern. This adaptive filtering process uses the motion vectors, irregular sampling pattern, and reference images to generate a prediction of the target image. At 750, the motion vector values are coded and sent to the decoder. At 760, a residual is generated, which is the actual target data of the target image minus the prediction error from the adaptive filtering process. At 770, the residual is coded and at 780 is sent to the decoder.

Figure 8:
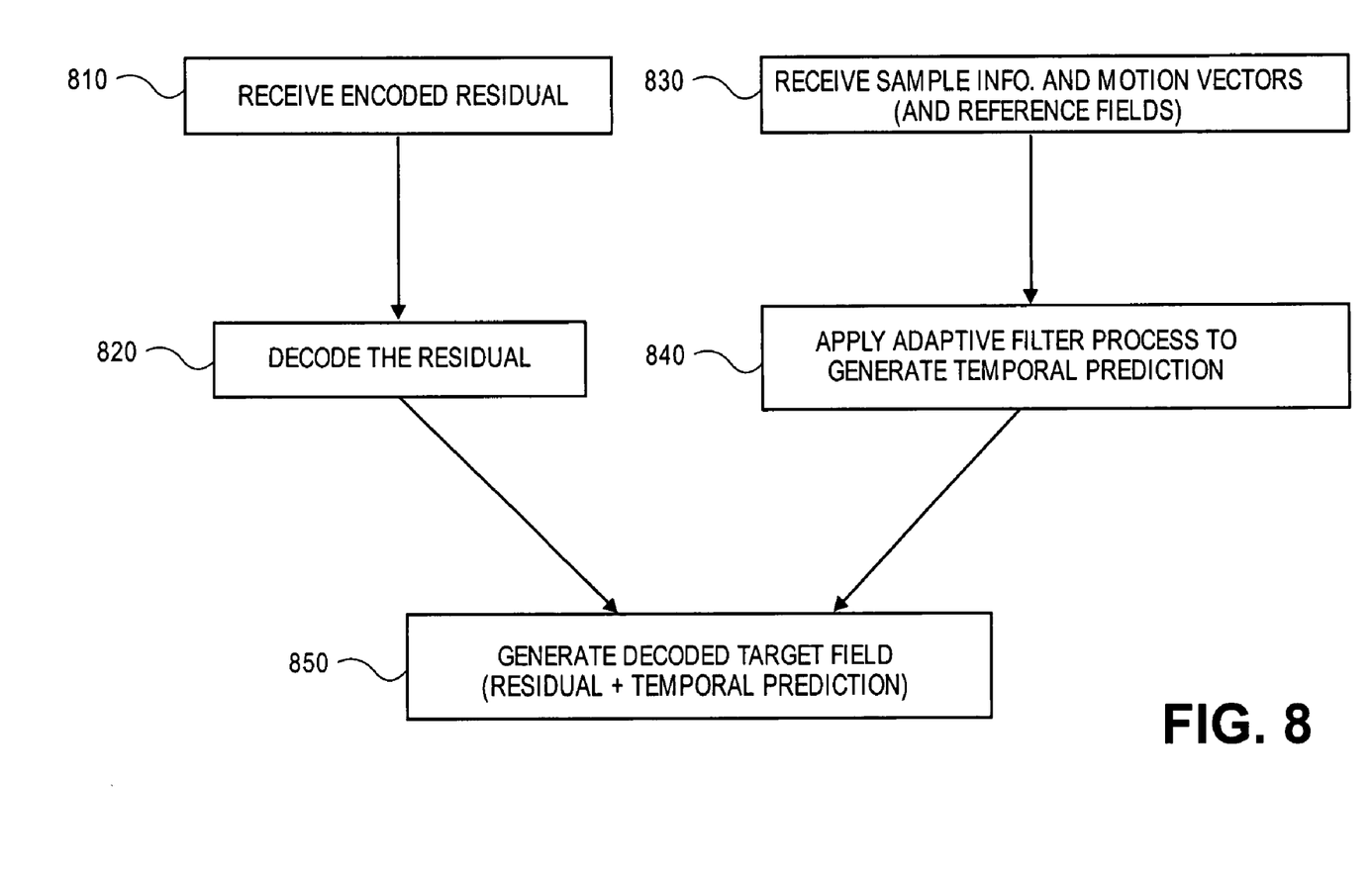
FIG. 8 shows an example of a decoding process that uses the adaptive temporal filter.

In another embodiment, the AAOI filter is used in decoding a image (or frame, or image) of video data, as shown in FIG. 8. At 810, an encoded residual is received. At 820, the decoder decodes the received encoded residual. At 830, the decoder receives the sample pattern information, reference images, and motion vector values. Then, at 840 the decoder applies the adaptive temporal filter procedure to generate the temporal prediction. At 850, the decoded target image is generated by adding the decoded residual to the temporal prediction.

Figure 9:
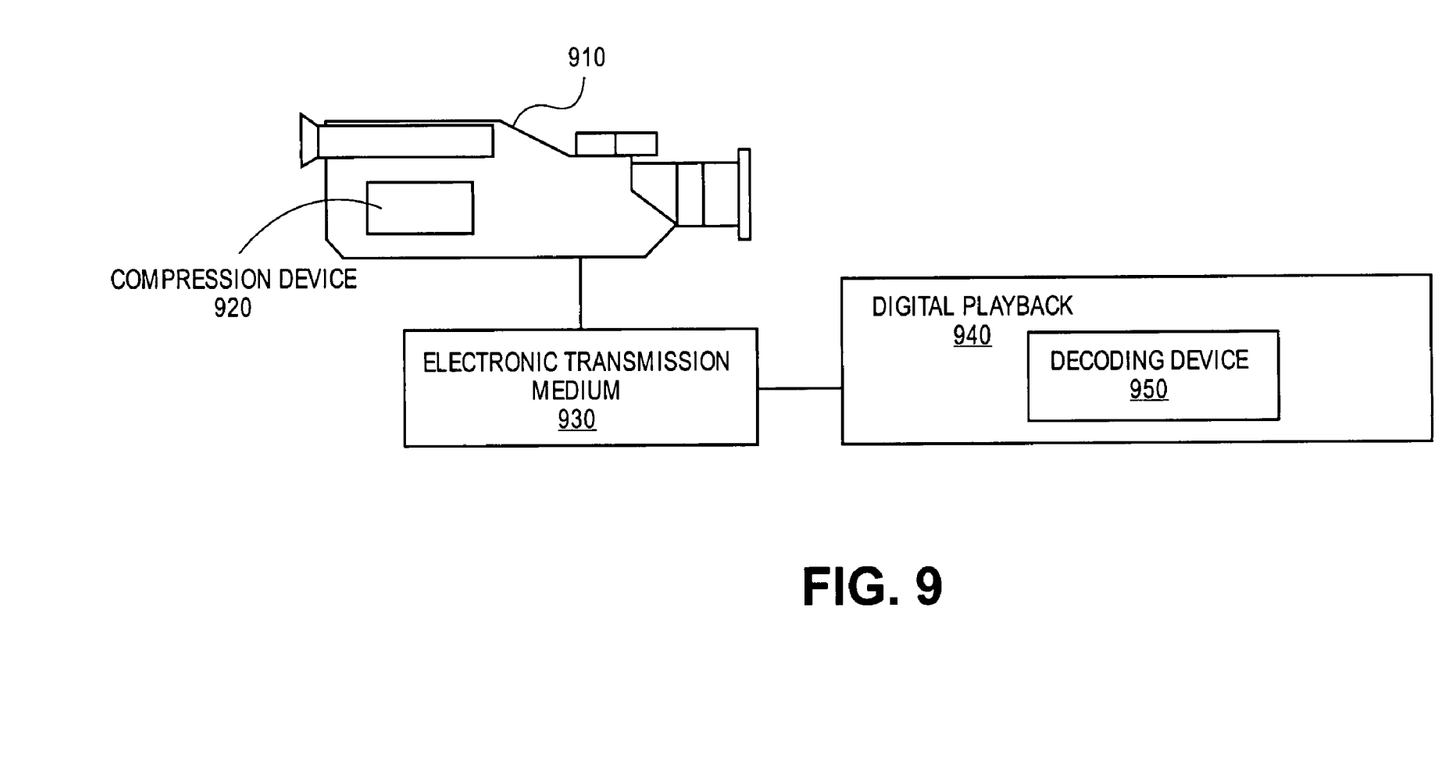
FIG. 9 shows an example of a system that uses the adaptive area of influence filter.

FIG. 9 shows an example of a system that uses the adaptive area of influence filter. A digital video camera 910 captures images in an electronic form, and processes the images using compression device 920, which uses the adaptive area of influence filter during the compression and encoding process. The encoded images are sent over an electronic transmission medium 930 to digital playback device 940. The images are decoded by decoding device 950, which uses the filter during the decoding process. Camera 910 is illustrative of various image processing apparatuses (e.g., other image capture devices, image editors, image processors, personal and commercial computing platforms, etc.) that include embodiments of the invention. Likewise, decoding device 950 is illustrative of various devices that decode image data.

While the invention is described in terms of embodiments in a specific system environment, those of ordinary skill in the art will recognize that the invention can be practiced, with modification, in other and different hardware and software environments within the spirit and scope of the appended claims.

The invention claimed is:

1. A method carried out in an electronic data processor, comprising:
   constructing, by the electronic data processor, a motion vector area cell around each of a plurality of motion vectors in a target image having a first resolution;
   selecting a pixel in the target image;
   constructing a pixel area cell around the selected pixel;
   determining an overlap area between the motion vector area cells in the target image and the pixel area cell in the target image, the overlap area determined using the target image at the first resolution;
   generating filter weights from the overlap area; and
   using the filter weights to filter the selected pixel.

2. The method of claim 1, further comprising:
   reducing a filter prediction error by revising values of the motion vectors.

3. The method of claim 2, wherein revising further comprises:
   identifying a motion vector that contributes a largest filter prediction error, and
   changing the value of the identified motion vector until the filter prediction error is reduced.

4. The method of claim 1, wherein determining the overlap area further comprises:
   adapting the motion vector area cells to an object boundary in the image by constraining the motion vector area cells and pixel area cell to include pixels that belong to the same object as the selected pixel and to remove other pixels.

5. The method of claim 1, wherein generating filter weights comprises:
   for each motion vector area cell having an overlap with the pixel area cell, determining $$S(x) = \{i \mid A_i > 0\}$$

$$f_i = \frac{A_i}{A}$$

where i is the motion vector in a set of local motion vectors S(x) around the pixel x, $A_i$ is the overlap area of the cell for motion vector i with the pixel area cell, A is the total overlap area of the motion vector cells with the pixel area cell, and $f_i$ is the filter weight.

6. The method of claim 1, wherein filtering comprises:
   predicting the target pixel such that, for an irregular motion vector pattern:

$$I^{pred}(x) = \sum_{i \in S(x)} f_i I^{ref}(x + v_i)$$

where x is the pixel to be predicted, $I^{pred}(x)$ is the predicted value of pixel x, S(x) is a set of motion vectors surrounding pixel x, $v_i$ is a motion vector, $f_i$ is a filter weight for a motion vector in the set S(x), $I^{ref}(x)$ is a value in the reference image, $x+v_i$ is the motion compensated pixel when motion vector $v_i$ is applied to pixel x.

7. The method of claim 1, further comprising:
   adapting the filtered pixel to a spatial texture of the image.

8. The method of claim 1, wherein determining the overlap area further comprises:
   adapting the motion vector area cells to a spatial texture by constraining the motion vector area cells and pixel area cell to include pixels with the spatial texture of the selected pixel and to remove other pixels.

9. The method of claim 1, wherein constructing a motion vector area cell around each of a plurality of motion vectors in a target image comprises:
   applying a nearest neighbor distance partition.

10. An apparatus comprising:
    a motion vector area cell constructor that constructs a motion vector area cell around each of a plurality of motion vectors in a target image having a first resolution;
    a selector that selects a pixel to filter in the target image;
    a pixel area cell constructor that constructs a pixel area cell around the selected pixel;
    an overlap area determinator that determines an overlap area between the motion vector cells in the target image and the pixel cell in the target image, the overlap area determined using the target image at the first resolution;
    a filter weight generator that generates filter weights from the overlap area; and
    a filter that uses the filter weights to filter the selected pixel.

11. The apparatus of claim 10, further comprising:
    a revisor that revises values of the motion vector to reduce a filter prediction error.

12. The apparatus of claim 11, wherein said revisor identifies a motion vector that contributes a largest filter prediction error; and
    changes the value of the motion vector until the filter prediction error is reduced.

13. The apparatus of claim 10, wherein said overlap area determinator adapts the motion vector area cells to an object boundary in the image by constraining the motion vector area cells and pixel area cell to include pixel that belong to the same object as the selected pixel and to remove other pixels.

14. The apparatus of claim 10, wherein said filter weight generator determines, for each motion vectors area cell having an overlap with the pixel area cell, $$S(x) = \{i \mid A_i > 0\}$$

$$f_i = \frac{A_i}{A}$$

where i is the motion vector in a set of local motion vectors S(x) around the pixel x, $A_i$ is the overlap area of the cell for motion vector i with the pixel area cell, A is the total overlap area of the motion vector cells with the pixel area cell, and $f_i$ is the filter weight.

15. The apparatus of claim 10, wherein said filter predicts the target pixel such that , for an irregular motion vector pattern:

$$I^{pred}(x) = \sum_{i \in S(x)} f_i I^{ref}(x + v_i)$$

where x is the pixel to be predicted, $I^{pred}(x)$ is the predicted value of pixel x, S(x) is a set of motion vectors surrounding pixel x, $v_i$ is a motion vector, $f_i$ is a filter weight for a motion vector in the set S(x), $I^{ref}(x)$ is a value in the reference image, $x+v_i$ is the motion compensated pixel when motion vector $v_i$ is applied to pixel x.

16. The apparatus of claim 10, wherein the filter adapts the target pixel to a spatial texture of the image.

17. The apparatus of claim 10, wherein said overlap area determinator adapts the motion vector area cells to a spatial texture by constraining the motion vector area cells and pixel area cell to include pixels with the spatial texture of the selected pixel and to remove other pixels.

18. The apparatus of claim 10, wherein said motion vector area cell constructor applies a nearest neighbor distance partition.

19. A non-transitory computer readable medium storing a program of instructions which, when executed by a processing system, cause the system to perform a method comprising:
   constructing a motion vector area cell around each of a plurality of motion vectors in a target image having a first resolution;
   selecting a pixel to filter in the target image;
   constructing a pixel area cell around the selected pixel;
   determining an overlap area between the motion vector area cells in the target image and the pixel area cell in the target image, the overlap area determined using the target image at the first resolution;
   generating filter weights from the overlap area; and
   using the filter weights to filter the selected pixel.

20. The non-transitory computer readable medium of claim 19, further comprising:
   reducing a filter prediction error by revising values of the motion vectors.

21. The non-transitory computer readable medium of claim 20, wherein revising further comprises:
   identifying a motion vector that contributes a largest filter prediction error; and
   changing the value of the identified motion vector until the filter prediction error is reduced.

22. The non-transitory computer readable medium of claim 19, wherein determining the overlap area further comprises:
   adapting the motion vector area calls to an object boundary in the image by constraining the motion vector area cells and pixel area cell to include pixels that belong to the same object as the selected pixel and to remove other pixels.

23. The non-transitory computer readable medium of claim 19, wherein generating filter weights comprises:
   for each motion vector area cell having an overlap with the pixel area cell, determining $$S(x) = \{i \mid A_i > 0\}$$
$$f_i = \frac{A_i}{A}$$

where i is the motion vector in a set of local motion vectors S(x) around the pixel, x, $A_i$ is the overlap area of the cell for motion vector i with the pixel area cell, A is the total overlap area of the motion vector cells with the pixel area cell, and $f_i$ is the filter weight.

24. The non-transitory computer readable medium of claim 19, wherein filtering comprises:
   predicting the target pixel such that, for an irregular motion vector pattern:

$$I^{pred}(x) = \sum_{i \in S(x)} f_i I^{ref}(x + v_i)$$

where x is the pixel to be predicted, $I^{pred}(x)$ is the predicted value of pixel x, S(x) is a set of motion vectors surrounding pixel x, $v_i$ is a value in the reference image, $x+v_i$ is the motion compensated pixel when motion vector $v_i$ is applied to pixel x.

25. The non-transitory computer readable medium of claim 19, further comprising:
   adapting the filtered pixel to a spatial texture of the image.

26. The non-transitory computer readable medium of claim 19, wherein determining the overlap area further comprises:
   adapting the motion vector area cells to a spatial texture by constraining the motion vector area cells and pixel area cell to include pixels with the spatial texture of the selected pixel and to remove other pixels.

27. The non-transitory computer readable medium of claim 19, wherein constructing a motion vector area cell around each of a plurality of motion vectors in a target image comprises:
   applying a nearest neighbor distance partition.

* * * * *